United States Patent Office 3,316,277
Patented Apr. 25, 1967

3,316,277
POLYEPOXIDES
Günter Frank and Rolf Kubens, Leverkusen, Robert Schmitz-Josten, Cologne-Stammheim, Richard Wegler, Leverkusen, and Heinz-Adolf Dortmann, Bergisch-Gladbach, Germany, assignors to Farbenfabriken Bayer Aktiengesellschaft, Leverkusen, Germany, a corporation of Germany
No Drawing. Filed Jan. 30, 1963, Ser. No. 255,099
Claims priority, application Germany, Feb. 3, 1962, F 35,921
7 Claims. (Cl. 260—348)

The present invention relates to special new aromatic polyepoxides and a process for preparation of such compounds.

It is known that polyvalent phenols may be converted using epihalogenhydrins in the presence of alkali to the corresponding polyglycidyl polyethers which may then be converted with acid hardening agents such as cyclic or linear polymeric acid anhydrides or basic hardening agents such as polyamines into cross-linked plastics. The disadvantage of these plastics is that they have insufficient impact strength, notched impact strength, flexibility and stretchability at a sufficiently high Martens temperature.

It is also known that epoxy esters, which may be obtained by treating salts of polybasic carboxylic acids with epihalogenhydrin may be used for producing cross-linked plastics. The production of these ester epoxides requires extreme reaction conditions, such as very elevated pressures and temperatures. Here again, it is not possible to obtain satisfactory mechanical properties, such as impact strength, if at the same time it is required to obtain satisfactory Martens temperatures.

It has now been found that new polyepoxides with particularly valuable properties may be obtained by reacting soluble organic polycondensation products, which contain at least two aromatic hydroxycarboxylic acid radicals bound through the carboxylic acid groups in ester and/or amide linkages, with an epihalogenhydrin or dihalogenhydrin under conditions known per se. The hydroxy groups of the aromatic hydroxycarboxylic acid radicals are converted in this process into 2:3-epoxypropoxy groups to produce soluble polycondensation products with several epoxy groups.

These new epoxides may contain several identical or preferred interest consists in a process for preparation of curable polyepoxides by reacting (a) an organic polycondensation product which contains per molecule at least one aromatic hydroxy-carboxylic acid radical

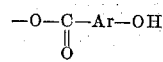

bound through an ester linkage and wherein Ar represents a bivalent aromatic carbocyclic ring system with (b) an epihalogenhydrin in the presence of alkali at elevated temperatures.

These new epoxides may contain several identical or different radicals of the general formula

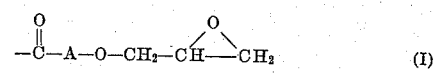

where A represents an aromatic radical, preferably a phenylene or a naphthalene radical, which may be substituted by additional 2:3-epoxypropoxy groups, alkyl radicals, halogen atoms, ester groups or other substituents. To effect the linkage of these radicals, organic compounds with several aliphatically bound hydroxy groups or organic compounds with several amino groups may be used, these radicals being bound to the hydroxy groups through an ester grouping and to the amino groups through an amide grouping.

The polyepoxides prepared according to the invention may be represented, for example, by the general formulae

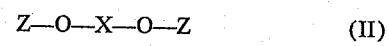

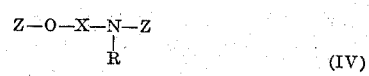

where $Z$=the same or different radicals of the general Formula I, $X$=a polyvalent aliphatic radical with 1–18 C-atoms which may contain additional radicals of the formulae

or —O—Z and may be interrupted by aromatic radicals, heteroatoms such as O or S or groups of heteroatoms containing sulphur, phosphorus or nitrogen, such as

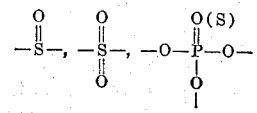

$Y$=a polyvalent aliphatic radical to which may be linked additional radicals of the formula

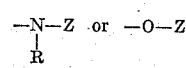

and may be interrupted by cycloaliphatic or aromatic radicals or by heteroatoms such as O or S or heteroatomic groupings containing nitrogen; $Y$ may also represent an aromatic radical.

R=H, an alkyl group, preferably with 1–8 C-atoms, cycloalkyl or aralkyl.

Polycondensation products of hydroxyarylcarboxylic acids with polyvalent alcohols, polyamines or amino alcohols may be used as starting materials for the manufacture of the polyepoxides according to the invention.

According to the preferred embodiment of this invention curable polyepoxide compositions are obtained by reacting (a) a diester of (α) an aliphatic dihydric alcohol having between 2–18 carbon atoms, the carbon chain of which may be interrupted by oxygen bridges or divalent carbocyclic ring systems with (β) a monocarboxylic acid of an aromatic six-membered carboxylic ring system containing 1–2 six-membered carboxylic ring systems and carrying at least one hydroxy group—preferably between 1–3 hydroxy groups—bound directly to the carboxylic ring system with (b) an epihalogenhydrin in presence of caustic alkylene at elevated temperatures.

More specifically said aliphatic dihydric alcohol mentioned before represents members of the following group:

(1) Saturated aliphatic dihydric alcohol having between 2–18 carbon atoms.

(2) Unsaturated aliphatic dihydric alcohol having between 4 and 18 carbon atoms.

(3) Saturated aliphatic dihydric ether alcohols, the carbon chain of these alcohols being interrupted by 1–7 oxygen bridges, especially polyethyleneglycols, polypropyleneglycols and polybutyleneglycols containing between 2–8 recurring alkylene units.

(4) Araliphatic saturated dihydric alcohols, especially such one containing phenylene radicals.

Suitable hydroxyaryl carboxylic acids are hydroxyaryl monocarboxylic acids, such as o-, m-, p-hydroxybenzoic acids, hydroxynaphthoic acids, hydroxydiphenylcarboxylic acids, hydroxyanthracenecarboxylic acids, hydroxynaphthaquinone carboxylic acids, hydroxyanthraquinonecarboxylic acids, dihydroxy- and trihydroxybenzoic acids, and polyhydroxynaphthoic acids which may be substituted, for example by alkyl groups or halogen atoms.

Examples of suitable polyhydric alcohols are: Ethylene glycol, propylene glycol, 1:4-butanediol, 1:4-butenediol, 2-dimethyl-1:3-propanediol, 1:12-octadecanediol, polyalkylene glycols such as diethylene glycol or triethyleneglycol, dialkanolamines such as diethanoalkylamines, thiodiglycols, trihydric and higher alcohols such as trimethylolpropane, pentaerythritol, glycerol, 1:3:6-hexanetriol, triethanolamine, aliphatic hydroxyketone, hydroxyalkylation products of the above compounds which contain 1–8 alkylene oxide radicals, particularly ethylene oxide radicals, for each hydroxy group, hydroxyalkylation products, particularly hydroxylation products of polyvalent phenols, such as hydroquinone, dihydroxydiphenylene-alkanes, dihydroxydiphenyloxide and dihydroxydiphenylsulphones.

Suitable polyamines or amino alcohols for the preparation of the above-mentioned condensation products are, for example: Primary and secondary aliphatic or cycloaliphatic diamines and amines of higher valency such as ethylene diamine, N:N′-dialkylethylenediamines, 1:3-propylenediamine, piperazine, polyalkylene polyamines such as diethylene triamine, 6-aminohexanol, 6-amino-2-ethyl-hexanol and 6-aminooctanol.

It is also possible to use hydroxyaryldicarboxylic acids such as hydroxyphthalic acids and hydroxynaphthoic dicarboxylic acids for the preparation of the polycondensation products and to esterify them with dihydric alcohols, in some cases in the presence of hydroxyarylmonocarboxylic acids and/or smaller quantities of tri- or higher hydric alcohols or amines. For preparation of said esters (polycondensation products) the usually employed esterification catalysts may be used, such as for example strong mineral acids, p-toluene-sulphonic acid and the like. The polycondensation products that are used according to the invention may be obtained also by reacting salts of hydroxyarylcarboxylic acids with the corresponding aliphatic polyhalides or by using, instead of the hydroxyarylcarboxylic acids, the esters of these acids with lower aliphatic alcohols and condensing them with polyhydric alcohols, amines or amino alcohols.

Suitable starting materials may also be obtained by treating 1 mol phosphorous oxychloride or phosphorous sulphochloride with 3 mols alkylene oxide, particularly ethylene oxide, and condensing the resulting chloroalkyl ester with salts of hydroxyarylcarboxylic acids.

To convert the above polycondensation products, which contain several phenolic groups, into polyepoxides, the polycondensation products are treated with an excess of epihalogenhydrins and/or dihalogenhydrins, preferably epichlorohydrin, in an alkaline medium. In order to keep the molecular weight of the epoxides as low as possible the epihalogenhydrins or dihalogenhydrins may be used in such quantities that 2–10 moles of the said compounds are present for each phenolic group (i.e. hydroxyl group bonded to the aromatic nucleus) of the polycondensation products. The reaction may be carried out in the presence of solubilising agents such as aromatic hydrocarbons, for example, benzene, toluene, xylene, primary, secondary or teritary alcohols and mixtures of these agents. The alkali, especially caustic alkali, such as for example NaOH or KOH, may be added in the form of a solid or an aqueous or alcoholic-aqueous solution and preferably in quantities of 1–1,2 mols of alkali for each phenolic group. The reaction may be carried out at 30–120° C., preferably 80 to 100° C.

It is also possible first to prepare the corresponding polychlorohydrins by the addition of epihalogenhydrin on to the polycondensation products in the presence of suitable catalysts such as teritary amines, quaternary ammonium salts, phosphines, phosphonium salts, inorganic salts, for example NaCl, KCl, LiCl and $MgCl_2$ or alkali metal- and alkaline earth phosphates, and then converting the polychlorohydrins into the corresponding polyepoxides by reaction with caustic alkali.

It is surprising that the reactions take place without saponification of the ester groups and that excellent yields are obtained. By suitable choice of the polycondensation products (chain lengths of the alcohols, amines, functionality of the alcohols or amines), it is possible to obtain polyepoxides which, after curing, possess the whole range of desirable mechanical properties (impact strength, resistance to bending, hardness, Martens temperature, flexibility, stretchability, abrasion resistance). It should be particularly noted that the cured products have remarkably high notched impact strength at high Martens temperatures so that in this respect they are superior to the hardened products hitherto known.

The polyepoxides obtained according to the invention may be cured by means of the usual acid and basic curing agents.

Suitable curing agents for low temperatures are especially polyakylene polyamines, such as for example diethylenetriamine, triethylene tetramine, tripropylene tetramine, pentaethylene hexamine and the like as well as polyether amines such as 4,4'-di-($\beta$) amino acyl and as polyether amines such as 4,4'-di-($\beta$) amino ethyl diamino dibutylether or di-($\gamma$) amino propyl ether of butane diol-(1,4). Said amines effect curing at temperatures between 15 and 35° C., preferably between 20–30° C. These amines are used in amounts corresponding to 0,8–1,2 amino hydrogen atoms per each epoxy grouping.

It is self-evident that also known acidic hardening agents, such as for example hexahydrophthalic acid anhydride, methylhexahydro-phthalic acid anhydride, chlorinated phthalic acid anhydride, pyromellitic acid anhydride may be employed, preferably if hardening at elevated temperatures, i.e. between 80 and 180° C. is desired. The amount of acidic curing agents is preferably about 1 mol of acidic anhydride per 1 mol of epoxy compound, preferably 0.7 mols of anhydride are employed per 1 mol of epoxy compound.

Owing to the extremely wide range of variation, the polyepoxides according to the invention have an extremely wide range of uses, for example for electrical insulations, in building, for the manufacture of laminated and moulded plastics, adhesives and putties and as coatings, varnishes and impregnating agents.

Example 1

A mixture of 151 g. ethyleneglycol-di-(4-hydroxy-benzoate) (0.5 mol), 462.5 g. epichlorohydrin (5 mols) and 100 ml. isopropanol is heated to boiling. 88 g. 50% sodium hydroxide (1,1 mol) are added dropwise in the course of one hour and the mixture is concentrated for 4 hours at boiling temperature, and excess epichlorohydrin and isopropanol are then distilled off by heating at a pressure of 15 mm. Hg until the internal temperature is 85° C. 250 ml. benzene and 200 cc. water are then added and the aqueous phase is separated and washed with saturated sodium chloride until neutral, and benzene is distilled off in a high vacuum (finally 1 mm. Hg) until the internal temperature is 135° C. After filtration, 194 g., which is approximately 94% of the theoretical yield, of an almost colourless resin is obtained at 120° C.; this resin has an epoxide equivalent of 257 (theoretical 207) and substantially the structure of ethylene glycol-di-(4,2':3'-epoxypropoxy-benzoate).

An epoxy compound obtained by the procedure of the foregoing example may be cured by means of triethylene tetramine at 25° C. said epoxy resin composition may be used in coating metal plates and sheets and yields highly elastic coatings, even if applied in layers having a thickness of several mm.

Example 2

A mixture of 241 g. 1:4-butyleneglycol-di-(4-hydroxybenzoate) (0.73 mol), 675 g. epichlorohydrin (7.3 mols) and 150 ml. tertiary butanol are heated to boiling. 118 g. 50% sodium hydroxide (1.76 mols) are added within ½ hour and the mixture is concentrated for 5 hours and then worked upon by one of the following methods:

(a) The liquid is filtered from the precipitated sodium chloride and left to crystallise. The crystals, 220 g. approximately 71% of the theoretical yield, have a melting point of 130–132° C. and an epoxide equivalent of 230 (theoretical 221) and are practically pure 1:4-butyleneglycol-di-(4-2':3'-epoxypropoxybenzoate).

(b) Excess epichlorohydrin and isobutanol are distilled off at 15 mm. Hg until the internal temperature is 90° C., and 500 cc. of water are added at 85° C. and the mixture is left to cool and stirred for 4 hours at room temperature. The crystals are then filtered by suction and washed with water and a small quantity of dilute acetic acid until neutral and dried at 50° C. Yield: 293 g. approximately 91% of theoretical yield. Epoxide equivalent: 273.

Example 3

514 g. of 50% sodium hydroxide (6.43 mols) are added drop by drop in the course of 4 hours to a mixture of 1135 g. 4:4'-dibutyleneglycol-di-(salicylate) (2.82 mols) 2610 g. epichlorohydrin (28.2 mols) and 1.2 methanol. The mixture is concentrated for 3 hours and excess epichlorohydrin and methanol are distilled off at 15 mm. Hg until the internal temperature is 90° C. The reaction mixture is then treated with 1 litre of water and 1 litre of benzene and the benzene layer is separated and washed with sodium chloride solution and dilute phosphoric acid until neutral. The benzene is then distilled off until the internal temperature is 120° C., the pressure at the end of distillation being 12 mm. Hg. Yield: 1435 g.=99% of theoretical, a liquid yellowish polyepoxide with an epoxide equivalent of 338. Viscosity at 20° C. approximately 2700 cp.

Example 4

A mixture of 748 g. (1.86 mols) of 4:4'-dibutyleneglycol-di-(4-hydroxybenzoate), 1720 g. (18.6 mols) epichlorohydrin and 750 cc. isopropanol is heated to boiling and stirred at the same time. 328 g. 50% sodium hydroxide (4.1 mols) are then added dropwise within one hour and the mixture is then concentrated for 4 hours under reflux and excess epichlorohydrin and isopropanol are then distilled off. After working the reaction product up in the usual way, the epoxide resin is filtered hot under pressure. About 940 g. 4:4'-dibutylene glycol-di-(2:3-epoxypropoxybenzoate) are obtained; viscosity approximately 9500 cp. at 20° C., epoxide equivalent: found 318, calculated 257.

Example 5

A mixture of 1060 g. (3.23 mols) of 4:4'-butene-2:3-diol-di-(4-hydroxybenzoate), 2990 g. (32.3 mols) of epichlorohydrin and 650 cc. tertiary butanol and 568 g. 50% sodium hydroxide (7.11 mols) are reacted together as in Example 4. When the reaction mixture has been worked up, the resin, which is at a temperature of about 50° C., is stirred into methanol and the precipitated crystals are isolated and dried at 80° C. Yield: 910 g.=64% of theoretical. Epoxide equivalent: calculated 220, found 291. Melting point 127–129° C.

Example 6

276 g. (0.73 mols) p-xylyleneglycol - di - (4-hydroxy-benzoate), 675 g. (7.3 mols) epichlorohydrin, 150 cc. isopropanol and 128 g. 50% sodium hydroxide (1.6 mols) are reacted as in Example 4. After distilling off the epichlorohydrin and isopropanol, 400 cc. of benzene are added to the reaction mixture and filtered hot from the sodium chloride by suction and cooled and left to stand for some time and the precipitated crystals are then isolated. Yield: 288 g. approximately 80% of theoretical. Melting point 116–122° C. Epoxide equivalent: calculated 245, found 328.

| Di(poly)phenol | Mol Ratio Di(poly)phenol: Epichlorohydrin | Solvent per OH-group | Alkali per OH-group | Epoxy equivalent (a) Calculated | Epoxy equivalent (b) Found | Condition |
|---|---|---|---|---|---|---|
| 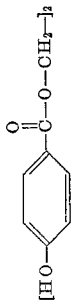 | 1:10 | 50 cm.³ isopropanol | 1.05 mol of 50% NaOH | 207 | 257 | Solid. |
| 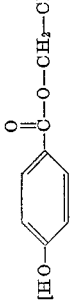 | 1:10 | 100 cm.³ tert.-but. | do | 221 | 231 | Do. |
| 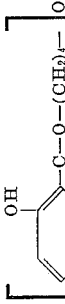 | 1:10 | 210 cm.³ methanol | 1.14 mol of 50% NaOH | 257 | 338 | Liquid. |
| 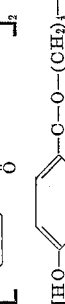 | 1:10 | 200 cm.³ isopropanol | 1.10 mol of 50% NaOH | 257 | 318 | Do. |
| 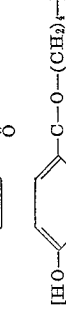 | 1:15 | 400 cm.³ isopropanol | 1.10 mol of 50% solid | 257 | 285 | Do. |
| 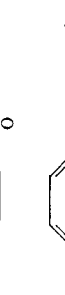 | 1:20 | do | 1.05 mol NaOH solid | 319 | 249 | Waxy. |
| 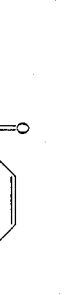 | 1:15 | do | 1.05 mol KOH solid | 317 | 367 | Do. |
| 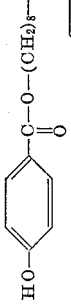 | 1:10 | 100 cm.³ tert.-but. | 1.05 mol of 50% NaOH | 220 | 291 | Solid. |

| Di(poly)phenol | Mol Ratio Di(poly)phenol: Epichlorohydrin | Solvent per OH-group | Alkali per OH-group | Reaction product Epoxy equivalent (a) Calculated | Reaction product Epoxy equivalent (b) Found | Condition |
|---|---|---|---|---|---|---|
| HO–⌬–C(=O)–O–CH$_2$–⌬–CH$_2$–O–C(=O)–⌬–OH | 1:10 | 100 cm.³ isopropanol | 1.1 mol of 50% KOH | 245 | 328 | Do. |
| HO–⌬–C(=O)–O–CH$_2$–⌬–CH$_2$–O–C(=O)–⌬–OH | 1:20 | do | 1.1 mol NaOH solid | 245 | 255 | Do. |
| HO–⌬–C(=O)–O–[CH$_2$–CH$_2$–O]$_7$–C(=O)–CH$_2$–⌬–OH | 1:20 | 300 cm.³ isopropanol | do | 361 | 400 | Liquid. |
| HO–⌬–C(=O)–O–[CH$_2$–CH$_2$–O]$_7$–CH$_2$–CH$_2$–O–C(=O)–⌬–OH (with OH on second ring) | 1:20 | do | 1.1 mol NaHO 50% | 361 | 450 | Do. |
| HO–⌬–C(=O)–O–CH$_2$–CH$_2$–O–⌬–C(CH$_3$)(CN$_3$)–⌬–O–CH$_2$–CH$_2$–O–C(=O)–⌬–OH | 1:10 | 400 cm.³ isopropanol | 1.1 mol of 20% NaOH | 334 | 401 | Solid. |
| HO–⌬–C(=O)–O–[–(CH$_2$)$_4$–O–]$_7$–C(=O)–(CH$_2$)$_4$–⌬–OH | 1:10 | 100 cm.³ tert. but | 1.1 mol of 50% NaOH | 473 | 550 | Waxy. |
| HO–⌬(OH)–C(=O)–O–CH$_2$–CH=CH–CH$_2$–O–C(=O)–⌬(OH)–OH | 1:10 | 100 cm.³ isopropanol | 1.05 mol of 50% NaOH | 220 | 351 | Solid. |

| Di(poly)phenol | Mol Ratio Di(poly)phenol: Epichlorohydrin | Solvent per OH-group | Alkali per OH-group | Reaction product | | Condition |
|---|---|---|---|---|---|---|
| | | | | Epoxy equivalent | | |
| | | | | (a) Calculated | (b) Found | |
| HO-naphthyl-C(=O)-O-(CH₂)₇- ]₂ | 1:10 | do. | 1.1 mol of 20% NaOH | 271 | 312 | Solid. |
| HO-naphthyl-C(=O)-O-(CH₂)₁₁-CH(-(CH₂)₅CH₃)-O-C(=O)-naphthyl-OH | 1:10 | 300 cm.³ isopropanol | do. | 369 | 413 | Do. |
| [ HO-naphthyl-C(=O)-O-(CH₂)₄- ]₂ | 1:10 | 100 cm.³ isopropanol | do. | 307 | 350 | Do. |
| HO-naphthyl-C(=O)-O[CH₂-CH₂-O]-CH₂-CH₂-O-C(=O)-naphthyl-OH | 1:10 | 200 cm.³ isopropanol | do. | 411 | 460 | Do. |
| [OH]₂-biphenyl-C(=O)-O-(CH₂)₂- | 1:20 | 50 cm.³ isopropanol | 1.05 mol of 20% NaOH | 184 | 219 | Do. |

| Di(poly)phenol | Mol Ratio Di(poly)phenol: Epichlorohydrin | Solvent per OH-group | Alkali per OH-group | Reaction product ||| 
| | | | | Epoxy equivalent || Condition |
| | | | | (a) Calculated | (b) Found | |
|---|---|---|---|---|---|---|
| 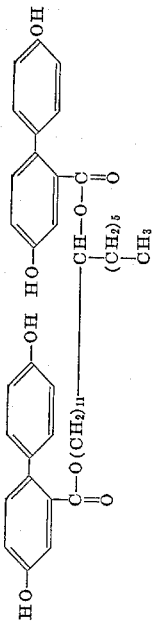 | 1:20 | 100 cm.³ isopropanol | do | 233 | 267 | Do. |
| 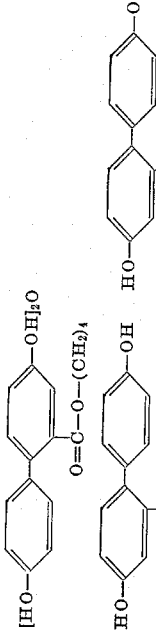 | 1:20 | 50 cm.³ isopropanol | do | 202 | 241 | Do. |
| 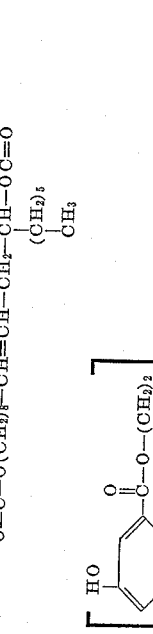 | 1:20 | 100 cm.³ isopropanol | do | 232 | 271 | Do. |
| 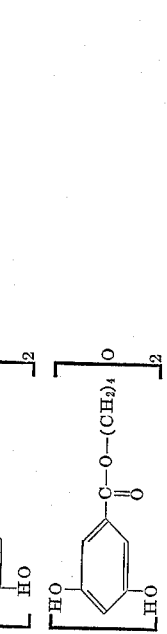 | 1:20 | 50 cm.³ isopropanol | do | 146 | 213 | Do. |
| 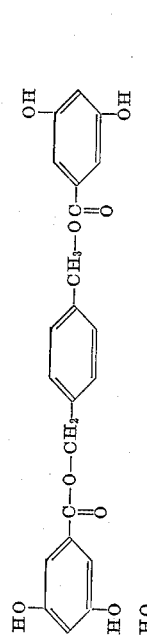 | 1:20 | do | do | 164 | 227 | Do. |
| 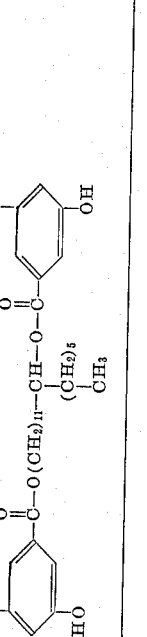 | 1:20 | 100 cm.³ isopropanol | do | 158 | 218 | Do. |
|  | 1:30 | do | do | 195 | 237 | Do. |

We claim:
1. A compound of the formula

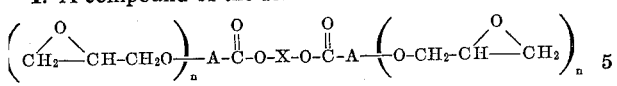

wherein X is a member selected from the group consisting of bivalent saturated aliphatic hydrocarbon having 2 to 18 carbon atoms, bivalent recurring alkylene groups connected by oxygen, there being from 2 to 8 said alkylene groups each having 2 to 4 carbon atoms, bivalent olefinically unsaturated aliphatic hydrocarbon having 4 to 18 carbon atoms, xylylene and

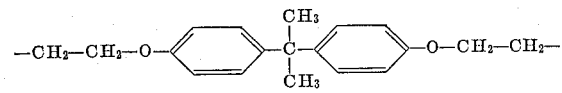

$n$ is an integer from 1 to 2 and A is a polyvalent aromatic hydrocarbon having 1 to 2 aromatic six-membered carbocyclic rings, the valency of A being $n+1$.

2. A compound of the formula

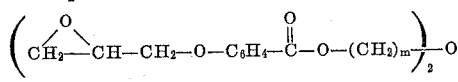

wherein $m$ is an integer from 2 to 4.

3. Di-glycidyl ether of 4,4'-dibutyleneglycol-di-(salicylate).

4. Di-glycidyl ether of 4,4'-dibutyleneglycol-di-(4-hydroxybenzoate).

5. A compound of the formula

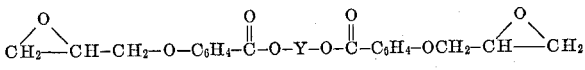

wherein Y is bivalent saturated aliphatic hydrocarbon having 2 to 18 carbon atoms.

6. Di-glycidyl ether of ethyleneglycol-di-(4-hydroxybenzoate).

7. Di-glycidyl ether of 1,4-butyleneglycol-di-(4-hydroxybenzoate).

References Cited by the Examiner
UNITED STATES PATENTS 2,089,569   8/1937   Orthner et al. _____ 260—47
2,925,426   2/1960   Schroeder _____ 260—78.3

WILLIAM H. SHORT, *Primary Examiner.*

T. D. KERWIN, *Assistant Examiner.*